(12) United States Patent
Nishiguchi

(10) Patent No.: US 9,467,550 B2
(45) Date of Patent: Oct. 11, 2016

(54) COMMUNICATION APPARATUS, EXTERNAL APPARATUS, AND CONTROL METHOD THEREFOR

(71) Applicant: CANON KABUSHIKI KAISHA, Tokyo (JP)

(72) Inventor: Tatsuya Nishiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/794,498

(22) Filed: Jul. 8, 2015

(65) Prior Publication Data
US 2016/0014256 A1    Jan. 14, 2016

(30) Foreign Application Priority Data
Jul. 10, 2014    (JP) .................................. 2014-142636

(51) Int. Cl.
*H04M 1/725*    (2006.01)

(52) U.S. Cl.
CPC ............................... *H04M 1/72533* (2013.01)

(58) Field of Classification Search
CPC ............. H04M 1/72533; H04M 1/21; H04M 1/72577; H04W 12/06; H04W 88/184; H04L 51/046; H04L 67/26; H04L 63/0023
USPC ............ 455/420, 574; 710/52, 20; 714/38.1; 340/10.42; 463/25, 42
See application file for complete search history.

(56) References Cited

U.S. PATENT DOCUMENTS

| | | | |
|---|---|---|---|
| 2007/0152076 A1 | 7/2007 | Chiang et al. | |
| 2010/0283586 A1* | 11/2010 | Ikeda | H04N 1/00007 340/10.42 |
| 2012/0264504 A1* | 10/2012 | Gagner | G07F 17/326 463/25 |

FOREIGN PATENT DOCUMENTS

| | | |
|---|---|---|
| JP | 2007-013880 A | 1/2007 |
| JP | 2008-167269 A | 7/2008 |
| JP | 2011-221995 A | 11/2011 |

OTHER PUBLICATIONS

The above references were cited in related U.S. Appl. No. 14/794,288, filed Jul. 8, 2015 "External Apparatus, Communication Apparatus, and Control Method Therefor".

* cited by examiner

*Primary Examiner* — Phuoc H Doan
(74) *Attorney, Agent, or Firm* — Cowan, Liebowitz & Latman, P.C.

(57) ABSTRACT

A communication apparatus which controls an external apparatus, comprises a communication unit configured to control communication with the external apparatus, a control unit configured to control the external apparatus by causing the communication unit to transmit, to the external apparatus, operation information for causing the external apparatus to execute a predetermined function, and a management unit configured to, when a function controllable on the external apparatus is added, manage additional function information that renders the added function usable also by second application software that is different from first application software, the first application software causing the control unit to function so as to control the external apparatus.

13 Claims, 8 Drawing Sheets

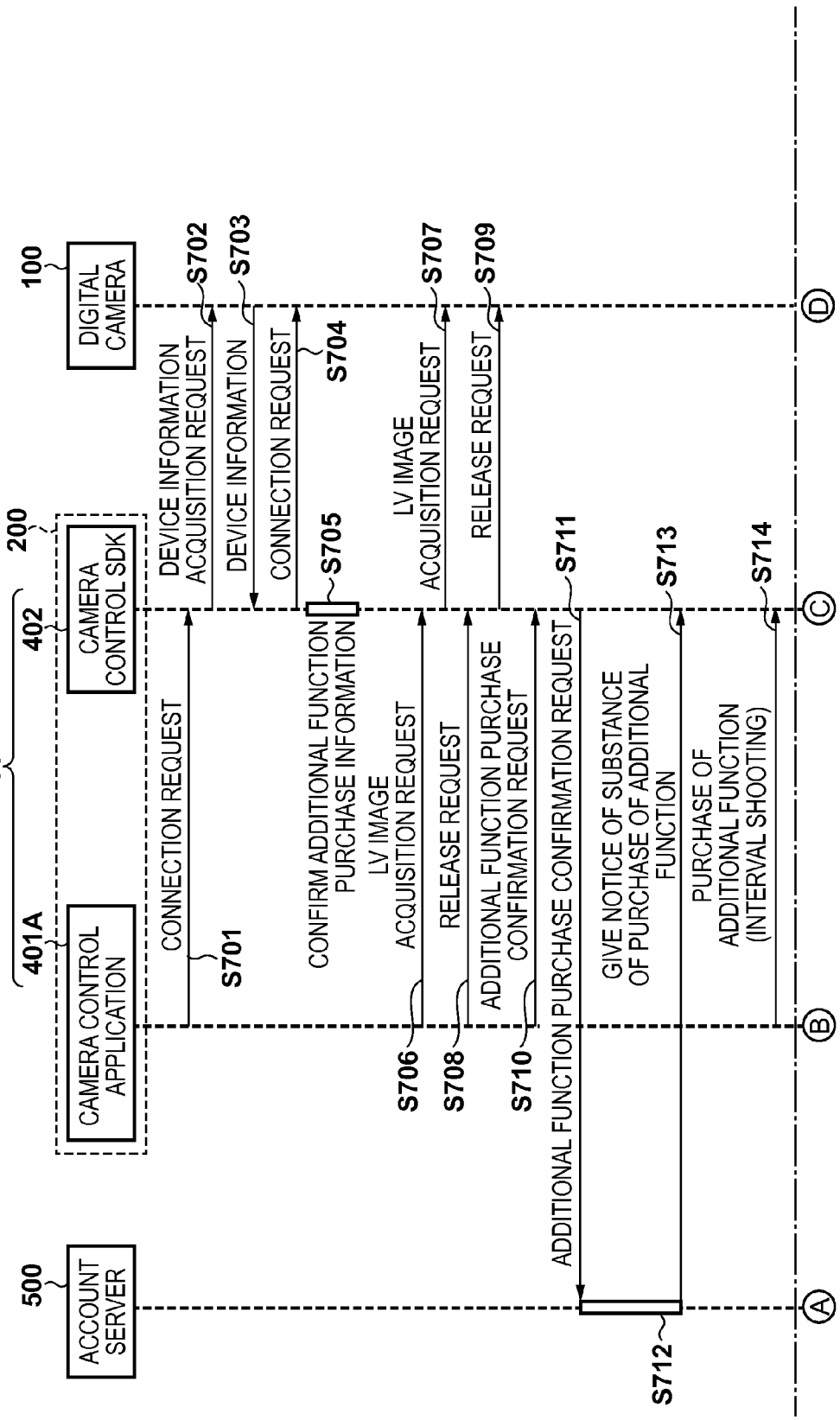

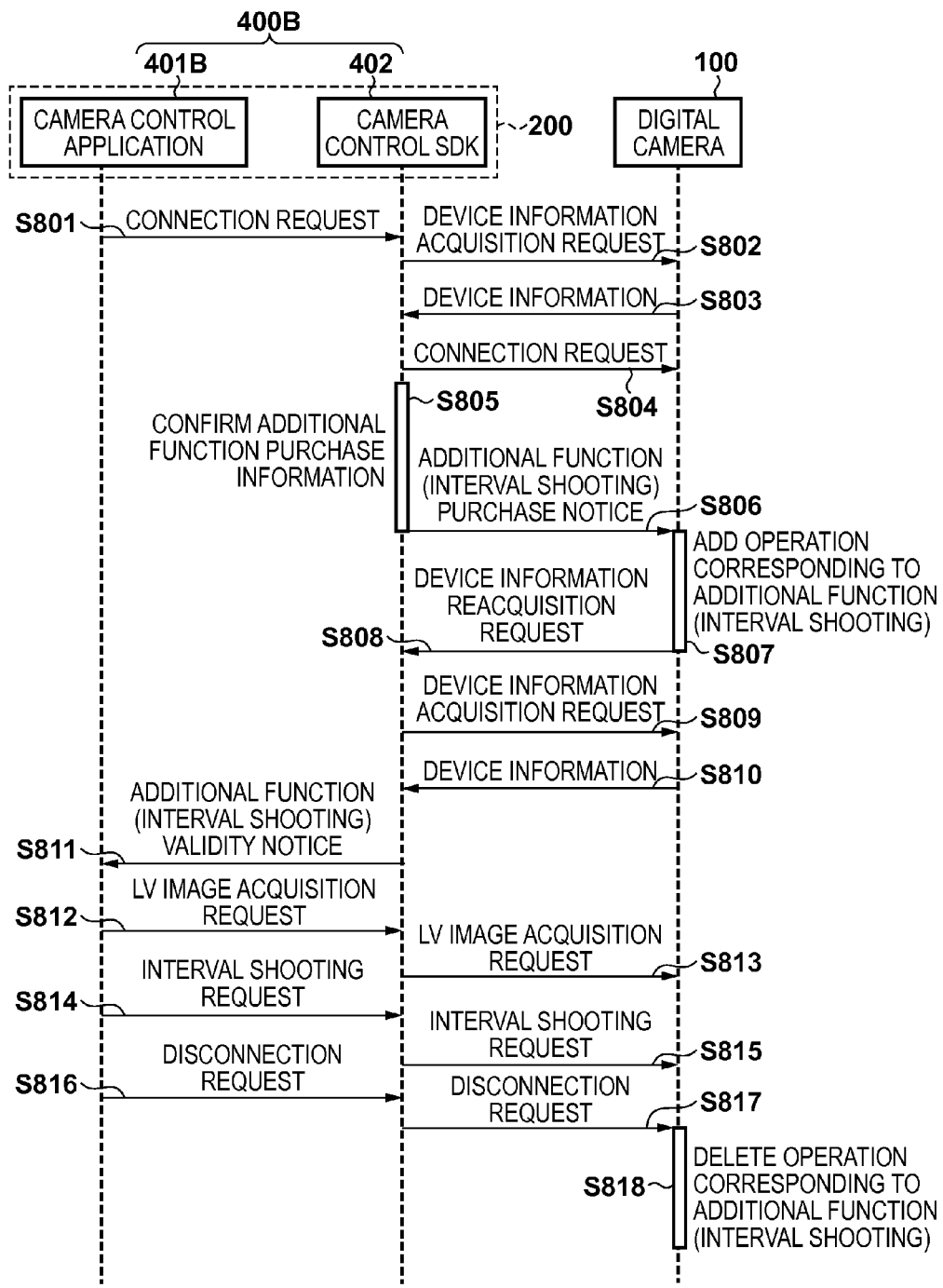

COMMUNICATION APPARATUS, EXTERNAL APPARATUS, AND CONTROL METHOD THEREFOR

BACKGROUND OF THE INVENTION

1. Field of the Invention

The present invention relates to a technique to remotely control an external apparatus using a communication apparatus.

2. Description of the Related Art

In recent years, there is an increasing demand to remotely control an external apparatus, such as a digital camera, from a communication apparatus, such as a smartphone. As application software (hereinafter, application) for controlling digital cameras from smartphones and the like, there are applications provided by camera manufacturers for their digital cameras; however, there is a demand by a third party other than these camera manufacturers to develop camera applications different from the provided applications.

To meet this demand, in some cases, camera manufacturers provide software development kits (hereinafter, SDKs) that enable camera control (Japanese Patent Laid-Open No. 2008-167269, Japanese Patent Laid-Open No. 2007-013880).

Some of the applications for controlling an external apparatus from the aforementioned communication apparatus validate an additional function upon purchase of add-in software for a fee. In this case, the additional function is normally usable only by an application that has purchased the additional function. Furthermore, when there are applications developed by different developers, add-in software needs to be purchased separately.

In view of this, in a case where add-in software for a certain apparatus has been purchased, there is a demand to use the additional function also on a different application in another apparatus or the same apparatus.

SUMMARY OF THE INVENTION

The present invention has been made in consideration of the aforementioned problems, and realizes a technique to allow an additional function that is usable by an application for controlling an external apparatus to be used also by a different application in another apparatus or the same apparatus.

In order to solve the aforementioned problems, the present invention provides a communication apparatus which controls an external apparatus, comprising: a communication unit configured to control communication with the external apparatus; a control unit configured to control the external apparatus by causing the communication unit to transmit, to the external apparatus, operation information for causing the external apparatus to execute a predetermined function; and a management unit configured to, when a function controllable on the external apparatus is added, manage additional function information that renders the added function usable also by second application software that is different from first application software, the first application software causing the control unit to function so as to control the external apparatus.

In order to solve the aforementioned problems, the present invention provides an external apparatus which is controlled by a communication apparatus, comprising: a communication unit configured to be capable of communicating with the communication apparatus; a control unit configured to execute a function corresponding to operation information received from the communication apparatus; and a notification unit configured to, when a function controllable on the external apparatus is added and a notice of operation information of the added function is issued from the communication apparatus, give notice of a usable state of the added function on the external apparatus to the communication apparatus.

In order to solve the aforementioned problems, the present invention provides a control method of a communication apparatus which controls an external apparatus, the method comprising: a step of controlling communication with the external apparatus; a step of controlling the external apparatus by transmitting operation information for causing the external apparatus to execute a predetermined function to the external apparatus; and a step of, when a function controllable on the external apparatus is added, managing additional function information that renders the added function usable also by second application software that is different from first application software for controlling the external apparatus.

In order to solve the aforementioned problems, the present invention provides a control method of an external apparatus which is controlled by a communication apparatus, the method comprising: a step of connecting to the communication apparatus in such a manner that communication can be performed with the communication apparatus; a step of executing a function corresponding to operation information received from the communication apparatus; and a step of, when a function controllable on the external apparatus is added and a notice of operation information of the added function is issued from the communication apparatus, giving notice of a usable state of the added function on the external apparatus to the communication apparatus.

In order to solve the aforementioned problems, the present invention provides a system in which a communication apparatus and an external apparatus are connected, wherein the communication apparatus comprises: a communication unit configured to control communication with the external apparatus; a control unit configured to control the external apparatus by causing the communication unit to transmit, to the external apparatus, operation information for causing the external apparatus to execute a predetermined function; and a management unit configured to, when a function controllable on the external apparatus is added, manage additional function information that renders the added function usable also by second application software that is different from first application software, the first application software causing the control unit to function so as to control the external apparatus, and wherein the external apparatus comprises: a communication unit configured to be capable of communicating with the communication apparatus; a control unit configured to execute a function corresponding to operation information received from the communication apparatus; and a notification unit configured to, when the function controllable on the external apparatus is added and a notice of operation information of the added function is issued from the communication apparatus, give notice of a usable state of the added function on the external apparatus to the communication apparatus.

According to the present invention, an additional function that is usable by an application for controlling an external apparatus can be used also by a different application in another apparatus or the same apparatus.

Further features of the present invention will become apparent from the following description of an exemplary embodiment (with reference to the attached drawings).

BRIEF DESCRIPTION OF THE DRAWINGS

FIGS. 7A and 7B show a processing sequence of a server, the camera application, and the digital camera according to the present embodiment.

FIG. 8 shows a processing sequence of the camera application and the digital camera according to the present embodiment.

DESCRIPTION OF THE EMBODIMENTS

An embodiment of the present invention will be described in detail below. The following embodiment is merely an example for practicing the present invention. The embodiment should be properly modified or changed depending on various conditions and the structure of an apparatus to which the present invention is applied. The present invention should not be limited to the following embodiment. Also, parts of the embodiment to be described later may be properly combined.

First Embodiment

The following describes a system in which a smartphone, which is one type of a mobile telephone, and a digital single-lens reflex camera (hereinafter, digital camera) are used as a communication apparatus and an external apparatus of the present invention, and the smartphone and the digital camera are connected via a network. Although the external apparatus is assumed to be a digital single-lens reflex camera in the present embodiment, the present invention is not limited in this way, and the external apparatus may be a compact digital camera, a mobile electronic apparatus such as a tablet, a personal computer equipped with a web camera, etc. Furthermore, although the communication apparatus is assumed to be a smartphone in the present embodiment, the present invention is not limited in this way, and the communication apparatus may be a tablet, a personal computer, a personal digital assistant (PDA), a mobile AV player, a game console, an electronic book, etc.

<Configuration of Digital Camera 100>

An overview of a configuration and functions of a digital camera 100 of the embodiment according to the present invention will now be described with reference to FIG. 1.

Figure 1:
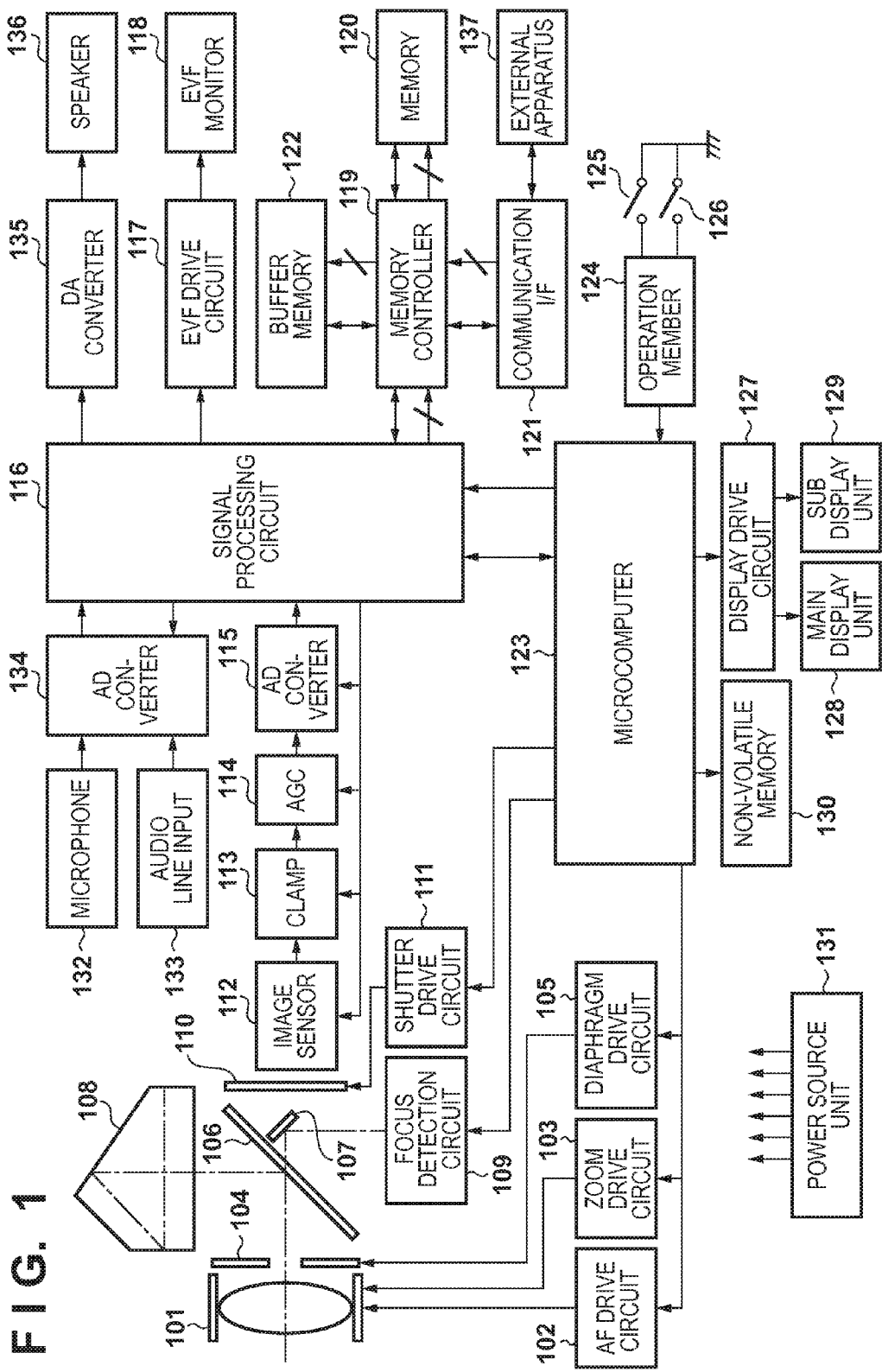
FIG. 1 is a block diagram showing a configuration of a digital camera according to the present embodiment.

In FIG. 1, a shooting lens 101 includes a zoom lens and a focus lens, and can be built in a camera body, or is attachable to and detachable from the camera body, as a lens unit. An autofocus (AF) drive circuit 102 includes, for example, a DC motor and an ultrasonic motor, and achieves focus by changing a focus lens position in accordance with a control instruction from a microcomputer 123.

A zoom drive circuit 103 includes, for example, a DC motor and an ultrasonic motor, and changes a focal length by changing a zoom lens position in accordance with a control instruction from the microcomputer 123.

A diaphragm drive circuit 105 drives a diaphragm 104 in accordance with a control instruction from the microcomputer 123 so as to change an optical f-number of the diaphragm 104. The optical f-number of the diaphragm 104 is calculated by the microcomputer 123.

A main mirror 106 switches between an optical path for directing a light beam incident from the shooting lens 101 toward a viewfinder and an optical path for directing the light beam toward an image sensor. A force is always applied so as to place the main mirror 106 in a mirror down position for directing the light beam toward the viewfinder; however, at the time of shooting and live view, a non-illustrated mirror drive circuit flips up the mirror, that is to say, places the mirror in a mirror up position by retracting the mirror from an optical axis, so as to direct the light beam toward the image sensor. The main mirror 106 is a half mirror that can transmit a part of the light beam at its central portion, and makes the part of the light beam incident on AF sensors for performing focus detection. It should be noted that the AF sensors are disposed inside a focus detection circuit 109. A sub mirror 107 reflects the light beam transmitted through the main mirror 106 toward the AF sensors.

A pentaprism 108 composes the viewfinder. The viewfinder is comprised of a non-illustrated focusing screen, eyepiece lens, and the like in addition to the pentaprism 108, and the light beam reflected by the main mirror 106 is incident on these components and directed to the viewfinder.

The focus detection circuit 109 performs focus detection using, for example, a phase difference between two images formed via the lenses, and includes a pair of AF sensors in the present example. The light beam that has been transmitted through the central portion of the main mirror 106 and reflected by the sub mirror 107 arrives at the pair of AF sensors that is disposed inside the focus detection circuit 109 for performing photoelectric conversion. A defocus amount indicating the state of focus adjustment of the shooting lens 101 with respect to a subject is obtained by calculating the output from the pair of AF sensors. The microcomputer 123 evaluates the calculation result and issues a control instruction to the AF drive circuit 102 so as to drive the focus lens.

A reference numeral 110 denotes a focal-plane shutter. A shutter drive circuit 111 drives the focal-plane shutter 110 at a shutter speed corresponding to a control instruction from the microcomputer 123.

An image sensor 112 is an image sensor using photoelectric conversion elements, such as a CCD and a CMOS, and generates an analog image signal by applying photoelectric conversion to a subject image formed by the shooting lens 101.

A clamp circuit 113 and an AGC circuit 114 apply basic analog signal processing to the analog image signal obtained from the image sensor 112, and their clamp level and AGC reference level are changed by the microcomputer 123.

An AD converter 115 converts the analog image signal which has been obtained from the image sensor 112 and to which the analog signal processing has been applied into a digital signal, and outputs the digital signal to a signal processing circuit 116.

The signal processing circuit 116 is realized by a logic device, such as a gate array. The signal processing circuit 116 applies filter processing, color conversion processing, gamma processing, and compression processing according to JPEG and the like to a digital image signal from the AD converter 115 or to image data read from a memory 120, and outputs the resultant image signal or image data to a memory controller 119. The memory controller 119 performs writing and reading of image data between the memory 120 or a buffer memory 122 and the signal processing circuit 116. The signal processing circuit 116 also calculates information of exposure (AE), white balance (WB), and the like as necessary using the image signal obtained from the image sensor 112, and outputs the calculation result to the microcomputer 123. The microcomputer 123 adjusts white balance and gain based on the calculation result.

In continuous shooting, image signals are first stored into the buffer memory 122 without being processed; then, the unprocessed image signals are read via the memory controller 119, and the signal processing circuit 116 applies image processing and compression processing thereto. The number of images obtained through continuous shooting depends on the capacity of the buffer memory 122.

The signal processing circuit 116 also applies compression processing to a digital audio signal input from a microphone 132 and audio line input 133 via an AD converter 134, and outputs the resultant digital audio signal to the memory controller 119. The signal processing circuit 116 can also output, to a speaker 136 via a DA converter 135, digital audio data that is input from the microphone 132 and audio line input 133. The DA converter 135 converts a digital signal into an analog signal.

An electronic viewfinder (EVF) drive circuit 117 displays image data output from the signal processing circuit 116 on an EVF monitor 118 in accordance with a control signal from the microcomputer 123.

The memory controller 119 stores an unprocessed digital image signal and audio signal input from the signal processing circuit 116 into the buffer memory 122, and stores a processed digital image signal and audio signal into the memory 120. The memory controller 119 also outputs image data and audio data read from the buffer memory 122 and the memory 120 to the signal processing circuit 116. In some cases, the memory 120 is detachable from an apparatus body. The memory controller 119 can output image data and audio data stored in the memory 120 to an external apparatus 137 via a communication interface (I/F) 121.

The communication I/F 121 has a function of transmitting and receiving a control signal, an image signal, an audio signal, and the like to and from the external apparatus 137. For example, a picture transfer protocol (PTP) or a media transfer protocol (MTP) is used as a protocol for establishing connection to and performing data communication with the external apparatus 137. It should be noted that no particular limitation is intended regarding a communication method, and communication may be performed using a wireless LAN, a wired LAN, USB, Bluetooth (registered trademark), etc. Here, the external apparatus 137 may be any apparatus, e.g., a personal computer, a camera, a mobile telephone, a smartphone, a hard disk recorder, a game console, and a remote control, as long as it can communicate with the digital camera 100. In a case where the communication I/F 121 performs communication using a wireless LAN, elements such as an antenna, an RF unit, and a baseband unit are provided, and packets compliant with the supported wireless LAN standards can be transmitted and received.

The microcomputer 123 is a calculation processing apparatus that integrally controls the entirety of the apparatus, and executes processing sequences described later by executing programs stored in a non-volatile memory 130.

An operation member 124 includes buttons, a dial, a touch panel (touchscreen), and the like for receiving a user operation. The microcomputer 123 controls various elements in accordance with a change in the state of the operation member 124.

The operation member 124 also includes a first switch 125 and a second switch 126 that are turned on and off by an operation on a release button.

The first switch 125 is turned on and generates a first switch signal SW1 in the middle of an operation on the release button provided to the camera, that is to say, when the release button is pressed halfway down (issuance of a shooting preparation instruction). The microcomputer 123 starts operations for AF processing, AE processing, WB processing, and the like in response to the first switch signal SW1.

The second switch 126 is turned on and generates a second switch signal SW2 when an operation on a shutter button has been completed, that is to say, when the shutter button is pressed all the way down (issuance of a shooting instruction). In response to the second switch signal SW2, the microcomputer 123 starts an operation for a series of shooting processes, from reading of a signal from the image sensor 112 to writing of image data to the memory 120.

Furthermore, while the first switch signal SW1 and the second switch signal SW2 are both in an on state, a continuous shooting operation is performed.

The operation member 124 also includes a main switch, a shooting mode dial, an ISO setting button, a menu button, a set button, a flash setting button, a button for switching among single shooting, continuous shooting, and a self-timer, a switch + (plus) button and a switch − (minus) button for switching to a menu and switching among reproduced images, an exposure correction button, a button for enlarging a displayed image, a button for reducing a displayed image, a reproduction switch, a diaphragm button, an erase button, a button for displaying information related to shooting and reproduction, etc.

A display drive circuit 127 drives a main display unit 128 on the back surface of the camera body and a sub display unit 129 inside the viewfinder in accordance with a control instruction from the microcomputer 123. A backlight (not illustrated) comprised of, for example, LEDs driven by the display drive circuit 127 is provided in the sub display unit 129. The microcomputer 123 checks the capacity of the memory 120 via the memory controller 119 based on a predicted value of image data corresponding to the ISO speed, image size, and image quality that have been set in advance. Based on the capacity of the memory 120, the microcomputer 123 calculates the remaining number of images that can be shot, and performs control to display the calculated number on the main display unit 128 and the sub display unit 129 as necessary.

The non-volatile memory 130 is an electrically erasable and recordable memory, such as an EEPROM. The non-volatile memory 130 stores constants, programs, and the like for the operations of the microcomputer 123. The programs mentioned here denote programs for executing processing sequences described later.

A power source unit 131 is constituted, for example, by a primary battery such as an alkaline battery and a lithium battery, by a secondary battery such as a NiCd battery, a NiMH battery, and a lithium-ion battery, or by an AC adaptor, and supplies necessary power to various elements.

<Configuration of Smartphone 200>

An overview of a configuration and functions of a smartphone 200 of the embodiment according to the present invention will now be described with reference to FIG. 2.

Figure 2:
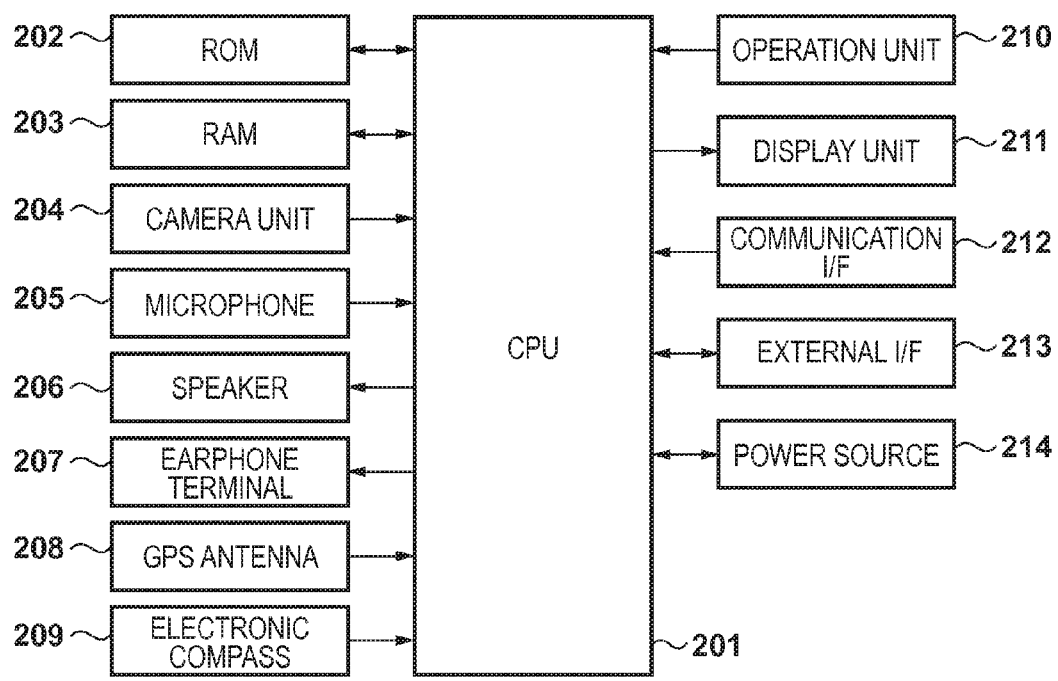
FIG. 2 is a block diagram showing a configuration of a smartphone according to the present embodiment.

In FIG. 2, a CPU 201 controls various elements of the smartphone 200. A RAM 203 is a main memory for storing data.

A ROM 202 is an electrically erasable and recordable flash memory, and is used to store data and various types of control programs, such as application programs and an OS executed by the CPU 201. The ROM 202 also stores various types of contents, such as moving images and still images captured by a camera unit 204.

The RAM 203 is mainly used as a storage area for various types of data, e.g., an area into which a program executed by the CPU 201 is stored or deployed, and a working area during program execution.

The camera unit 204 includes an image sensor constituted by, for example, a CMOS for converting a subject image into an electrical signal, a lens for forming the subject image onto the image sensor, a diaphragm, a shutter, etc. The camera unit 204 also includes an A/D converter for converting an analog image signal output from the image sensor into a digital signal.

A microphone 205 and a speaker 206 are used in a call to/from a user of another communication apparatus. The speaker 206 and an earphone terminal 207 output an audio signal stored in the ROM 202, and an audio signal input from, for example, a telephone line via a communication I/F 212, an external I/F 213, and the like.

A global positioning system (GPS) unit 208 has a GPS antenna for acquiring information of the current position of the smartphone 200 by receiving radio waves from a GPS satellite.

An electronic compass 209 acquires information of the direction in which the smartphone 200 is facing by detecting the geomagnetic orientation.

An operation unit 210 is comprised of a physical switch, button, and the like, receives a user operation, and transmits a control signal to the CPU 201. The CPU 201 receives a control signal input from the operation unit 210, and controls various elements of the smartphone 200. The operation unit 210 also includes a touch panel that can detect contact with a display unit 211, and constitutes a GUI that enables the user to feel as if he/she can directly operate a screen displayed on the display unit 211. The CPU 201 detects the user's contact with the touch panel and executes processing corresponding to the position of contact. The type of the touch panel may be selected from among various types including a resistive type, a capacitive type, a surface acoustic wave type, an infrared type, an electromagnetic induction type, an image recognition type, and an optical sensor type.

The display unit 211 is, for example, a liquid crystal panel or an organic EL panel, and displays images, a GUI, and the like.

The touch panel is integrally constructed with the display unit 211, and the capable of detecting a touch operation on the display unit 211. Input coordinates on the touch panel and display coordinates on the display unit 211 are correlated. As a result, a GUI can be constructed that makes it possible for the user to directly manipulate the screen displayed on the display unit 211. The CPU 201 is capable of detecting the following operations performed by contacting the touch panel: touching of the panel using a finger or pen (referred to as "touch-down" below); a state in which the touch panel is in contact with a finger or pen (referred to as "touch-on" below); movement of a finger or pen while in contact with the touch panel (referred to as "move" below); lifting of a finger or pen that has been in contact with the touch panel (referred to as "touch-up" below); and a state in which the touch panel is not being touched at all (referred to as "touch-off" below). These operations and position coordinates at which the touch panel is being touched by the finger or pen are communicated to the CPU 201 and, based upon the information thus communicated, the CPU 201 determines what kind of operation was performed on the touch panel. As for "move", the determination can be made also for every vertical component and horizontal component with regard to the direction of movement of the finger or pen, which is moved on the touch panel, based upon a change in the coordinate position. Further, it is assumed that a stroke has been made when "touch-up" is performed following a regular "move" after a "touch-down" on the touch panel. A very quick stroke action is referred to as a "flick". A "flick" is an operation in which, with fingers in contact with the touch panel, the fingers are moved rapidly over a certain distance and then lifted. In other words, this is a rapid tracing operation in which the fingers are flicked across the surface of the touch panel. The CPU 201 can determine that a "flick" has been performed when it detects such movement over a predetermined distance or greater and at a predetermined speed or greater and then detects "touch-up". Further, the CPU 201 can determine that "drag" has been performed if it detects movement over a predetermined distance or greater at a speed less than a predetermined speed.

The communication I/F 212 has a function of transmitting and receiving a control signal, an image signal, an audio signal, and the like to and from an external apparatus, such as a digital camera, a printer, and another communication apparatus. For example, a picture transfer protocol (PTP) or a media transfer protocol (MTP) is used as a protocol for establishing connection and performing data communication with a digital camera. It should be noted that no particular limitation is intended regarding a communication method, and communication is performed using a wireless LAN, a wireless wide area network (WWAN), a wired LAN, Bluetooth (registered trademark), etc. Here, the external apparatus may be any apparatus, e.g., a personal computer, a camera, a mobile telephone, a smartphone, a hard disk recorder, a game console, and a remote control, as long as it can communicate with the smartphone 200. In a case where the communication I/F 212 performs communication using a wireless LAN, elements such as an antenna, an RF unit, and a baseband unit are provided, and packets compliant with the supported wireless LAN standards can be transmitted and received.

The external I/F 213 is in conformity with various types of standards, such as USB and HDMI (registered trademark), and exchanges video data and audio data with the external apparatus. The external I/F 213 also exchanges data with a recording medium, such as a memory card and a hard disk.

A power source unit 214 is constituted by a secondary battery such as a lithium-ion battery or by an AC adaptor, and supplies necessary power to various elements.

<System Configuration>

A system configuration of the present embodiment will now be described with reference to FIG. 3.

In the system according to the present embodiment, the digital camera 100 and the smartphone 200 are connected via the communication I/Fs 121, 212, and the smartphone 200 can remotely control the digital camera 100.

Figure 3:
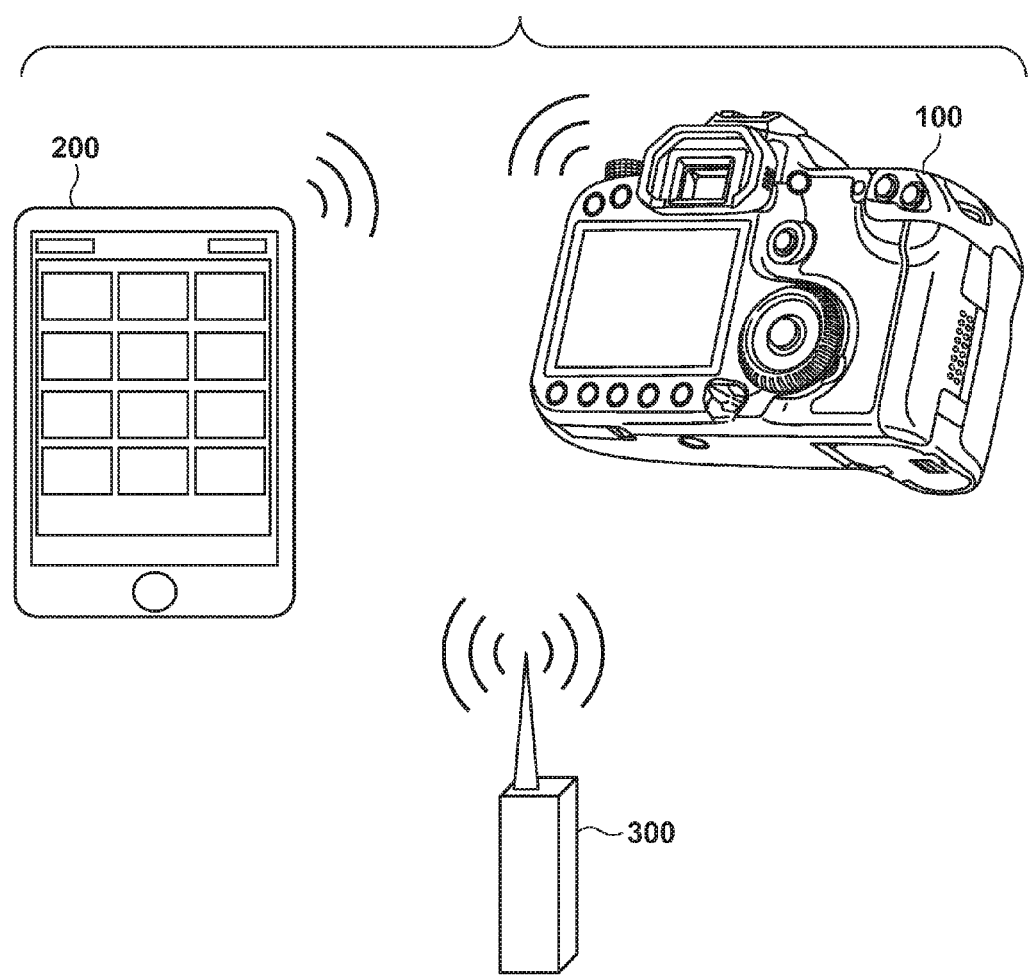
FIG. 3 shows a system configuration according to the present embodiment.

As shown in FIG. 3, the digital camera 100 and the smartphone 200 are connected via an access point (hereinafter, AP) 300 compliant with the wireless LAN standards of IEEE 802.11. It should be noted that communication between the digital camera 100 and the smartphone 200 may be performed through direct connection using an ad hoc network and the like, or through infrastructure connection via the AP 300 and the like. Furthermore, the digital camera 100 may serve as a simple access point so as to establish communication directly with the smartphone 200 through infrastructure connection.

<Description of Application>

Figure 4:
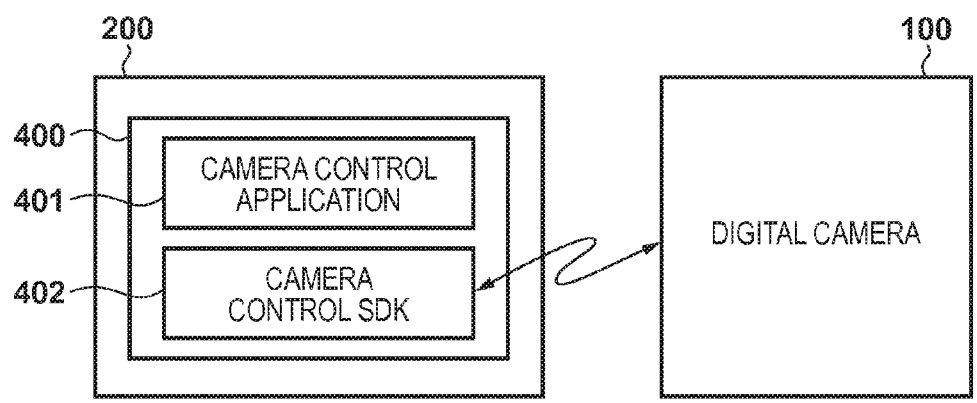
FIG. 4 shows a software configuration of a camera application according to the present embodiment.

A description is now given of a software configuration of a camera application according to the present embodiment with reference to FIG. 4.

In order to realize the system according to the present embodiment, it is necessary to install, in the smartphone 200, communication control application software (hereinafter, camera application) 400 for remotely controlling the digital camera 100. It should be noted that the camera application 400 may be preinstalled at the time of shipment of the smartphone 200, or may be installed by a user operation after the purchase of the smartphone 200.

The camera application 400 is application software that is mainly used to remotely control the digital camera 100. The user can download the camera application 400 from a predetermined server via, for example, the Internet, and install the same in the smartphone 200.

The camera application 400 includes a camera control software development kit (SDK) 402, which is a software program playing a role in communication with the digital camera 100, as a library. Direct communication between the digital camera 100 and the smartphone 200 having the camera application 400 installed therein is performed via this camera control SDK (hereinafter, camera SDK) 402, which is a communication application software program. A control application software program other than the camera SDK 402 (hereinafter, camera control application 401) plays a role in other functions, e.g., receiving a user operation, displaying a GUI, and activating/deactivating the camera application 400.

The camera SDK 402 is expected to be provided from a vendor of the digital camera 100 to an application developer. Therefore, the application developer determines whether to incorporate the camera SDK 402, which is provided for a smartphone OS, into the application 400 depending on the smartphone 200 that is expected to install the application therein.

<Basic Processing Sequence of Camera Application>

Figure 5:
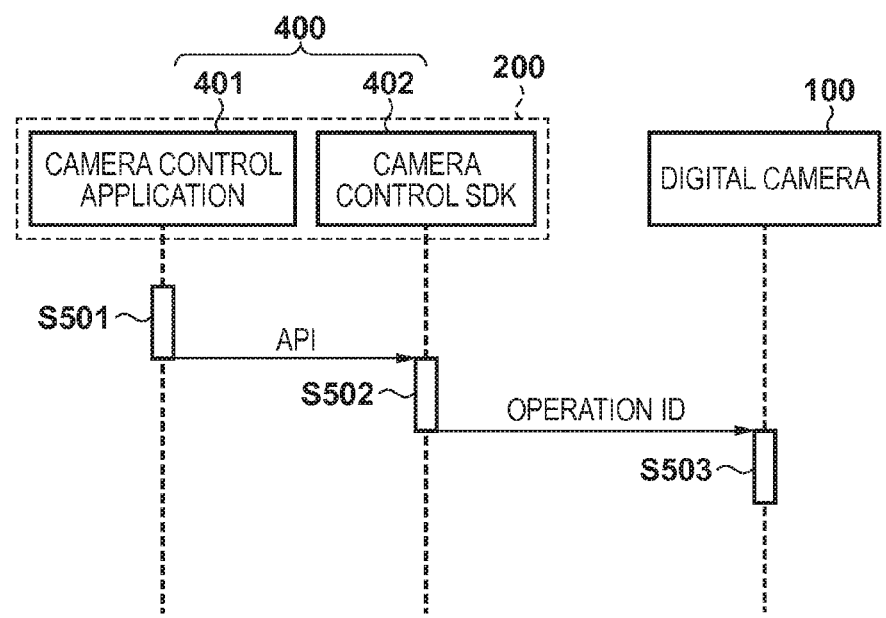
FIG. 5 shows a basic processing sequence of the camera application according to the present embodiment.

A description is now given of a basic processing sequence of the camera application 400 for a case in which connection between the digital camera 100 and the smartphone 200 has been established with reference to FIG. 5.

In FIG. 5, the camera control application 401 calls up an application programming interface (hereinafter, API) of the camera SDK 402 corresponding to a substance of desired control, and requests the camera SDK 402 for processing (step S501).

Upon receiving the API call from the camera control application 401, the camera SDK 402 identifies operation information (ID) of a communication protocol that is suitable for a substance of processing for the called API, and transmits the operation ID to the digital camera 100 (step S502).

Upon receiving the operation ID from the camera SDK 402, the digital camera 100 executes camera control corresponding to the requested operation ID (step S503).

Examples of the types of control functions corresponding to operation IDs transmitted from the camera SDK 402 to the digital camera 100 include AF start (shooting preparation operation), release, change in a shooting parameter, live view (LV) start, acquisition of an LV image, and acquisition of an image file.

As indicated above, communication between the digital camera 100 and the camera SDK 402 is controlled using operation IDs.

It should be noted that the following operations are prepared in the present embodiment: operations that can be controlled by the camera SDK 402 in a normal connection state, and additional function operations that validate additional functions upon purchase of add-in software for a fee. The additional function operations are not valid in a normal connection state; upon receiving, from the camera SDK 402, an additional function purchase notice indicating that the additional functions have been purchased, the additional function operations are added to the digital camera 100 as newly controllable operations.

Examples of the additional function operations include an interval shooting function and a raw development function (see FIGS. 6A to 6E).

<Processing Sequence of Camera Application, Server, and Digital Camera>

Figure 7B:
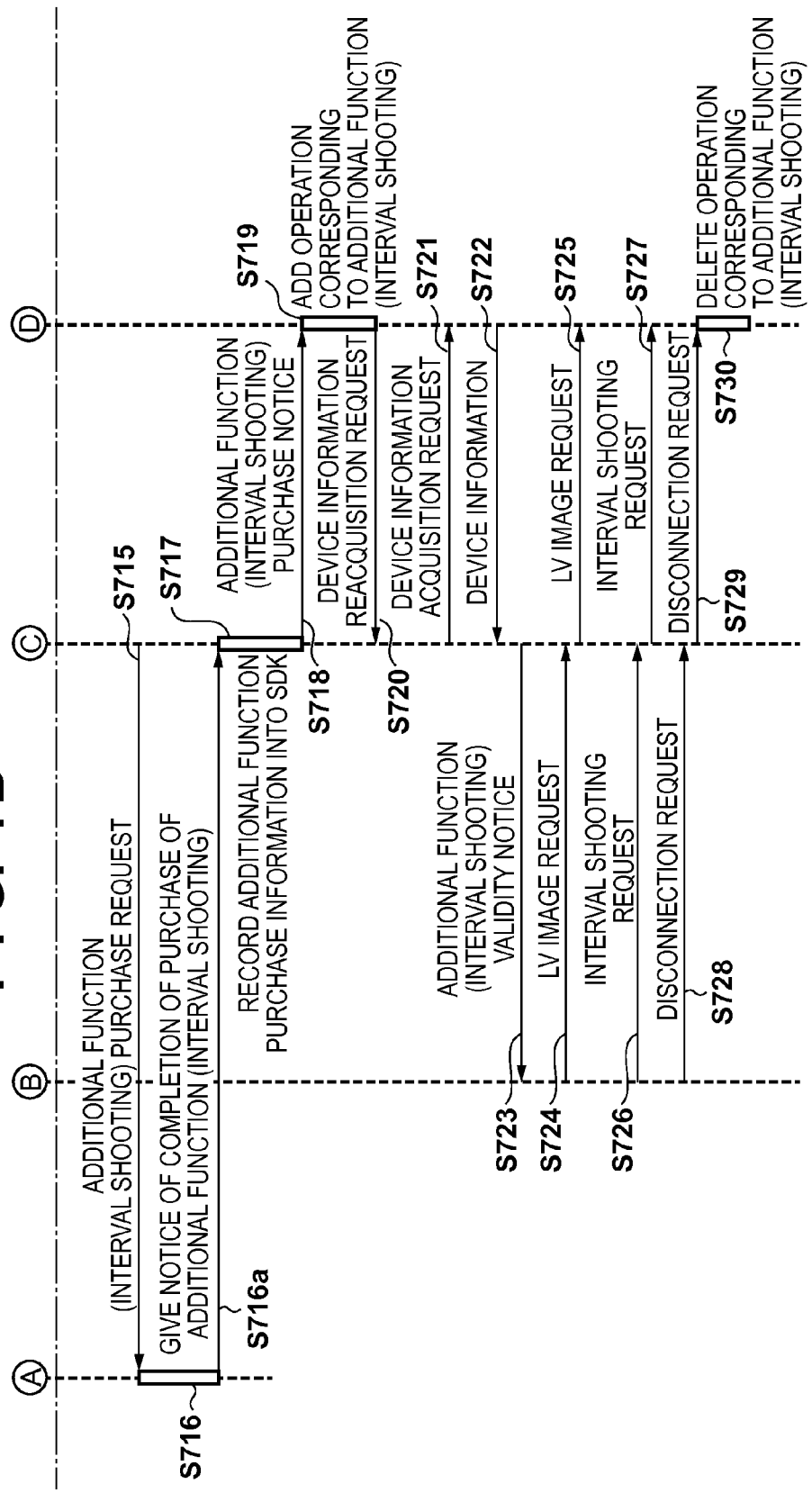

A description is now given of a processing sequence of the camera application 400 in the smartphone 200, a server, and the digital camera 100 according to the present embodiment with reference to FIGS. 7A and 7B.

The following describes a case in which the smartphone 200 uses a camera application 400A of company A.

The processing sequence according to the present embodiment is started when connection between the smartphone 200 in which the camera application 400A has been activated and the digital camera 100 is established in accordance with the procedure described with reference to FIG. 5. It should be noted that, in the processing sequence according to the present embodiment, processing of the digital camera 100 is realized by the microcomputer 123 reading a control program stored in the non-volatile memory 130 into a system memory, such as a RAM, and executing the read control program. On the other hand, processing of the smartphone 200 is realized by the CPU 201 reading a control program stored in the ROM 202 into the RAM 203 and executing the read control program.

Below, processing executed by reading, from the camera application 400, a camera control application 401A independently of the camera SDK 402 and processing executed by reading the camera SDK 402 will be discussed in distinction from each other. To facilitate the understanding, these items of software will be treated as the main executors of processing in some portions of the following description; however, in reality, the main executor of operations is the CPU 201 that has read the camera control application 401A or the camera SDK 402.

In FIG. 7A, once the camera application 400A has been activated in the smartphone 200 by a user operation, the camera control application 401A issues a connection request to the camera SDK 402 (step S701).

Upon receiving the connection request, the camera SDK 402 transmits a device information acquisition request to the digital camera 100 (step S702).

Upon receiving the device information acquisition request, the digital camera 100 transmits device information to the smartphone 200 (step S703). The device information includes operations supported by the digital camera 100, valid events, and current properties.

A description of the device information will now be given.

Operations are control commands addressed to the digital camera 100, and are mainly classified into operations of causing the digital camera 100 to transmit an image held therein, and operations of controlling a shooting function of the digital camera 100. One example of the operations of causing the digital camera 100 to transmit an image held therein is "acquisition of an image file" whereby the digital camera 100 transmits image data to the external apparatus (in the present example, the smartphone 200). One example of the operations of controlling the shooting function is "release" for causing the digital camera 100 to shoot a still image. Other examples include "live view (LV)" whereby the digital camera 100 transmits a live view image to the external apparatus (in the present example, the smartphone 200), and "start and stop of moving image recording" for causing the digital camera 100 to record moving images. Furthermore, an "additional function purchase notice" for validating an additional function on the digital camera 100 is also included among these operations. Examples of operations that become usable upon purchase of additional functions include "interval shooting" for causing the digital camera 100 to shoot a still image in every certain time period, and "raw development" for causing the digital camera 100 to apply development processing to a raw image.

In step S703, first, notice is given of camera control operations corresponding to "acquisition of an image file", "release", "LV", "start and stop of moving image recording", and the like, as well as an operation corresponding to the "additional function purchase notice", as usable operations.

Events are information for giving notice of actions that occurred in the digital camera 100 to the external apparatus (in the present example, the smartphone 200). Examples of the events include a change in a setting value of the digital camera 100 on the camera side, and shooting caused by an operation on the camera side.

The properties are shooting parameters of the digital camera 100, and examples thereof include an f-number, a shutter speed, and an ISO speed.

Returning to FIG. 7A, upon receiving the device information, the camera SDK 402 transmits an operation corresponding to a connection request to the digital camera 100 (step S704).

Thereafter, the camera SDK 402 refers to an SDK management file stored in the ROM 202 and confirms whether there is additional function purchase information indicating that an additional function(s) has been purchased; if there is no additional function purchase information, no processing is executed with respect to the digital camera 100 (step S705).

A description is now given of a processing sequence in which the camera application 400A controls the digital camera 100.

FIGS. 6A to 6E show application screens that are displayed on the display unit 211 upon activation of the camera application 400A. These UI screens may be displayed at the same time as the activation of the camera application 400A, or may be displayed after receiving a notice of completion of processing up until step S705 from the camera SDK 402.

Figure 6A:
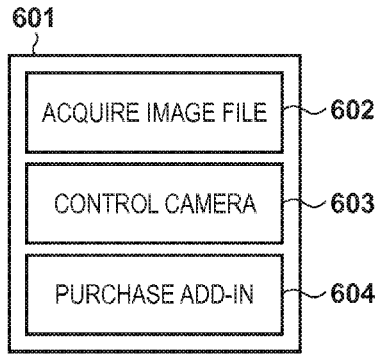
FIGS. 6A to 6E show examples of application screens.

A GUI screen shown in FIG. 6A includes an image file acquisition button 602, a camera control button 603, and an add-in purchase button 604.

The image file acquisition button 602 is a button for acquiring an image file held in the digital camera 100 by executing processing for transmitting the image file from the digital camera 100 to the smartphone 200.

The camera control button 603 is a button for switching to a mode for remotely controlling the digital camera 100. Once the camera control button 603 has been operated by the user, a camera control screen 611 shown in FIG. 6B is displayed, and control of the digital camera 100 from the smartphone 200 is enabled. In FIG. 6B, a live view display region 612 and still image shooting 613 are displayed as examples of functions of the digital camera 100 that can be controlled by the smartphone 200.

A description is now given of a case in which the camera control screen shown in FIG. 6B is displayed.

Once the camera control screen 611 has been displayed, the camera control application 401A issues an LV image acquisition request to the camera SDK 402 (step S706).

Upon receiving the LV image acquisition request, the camera SDK 402 transmits an LV image acquisition request to the digital camera 100 (step S707).

Upon receiving the LV image acquisition request, the digital camera 100 transmits a generated LV image to the camera SDK 402, and the camera SDK 402 passes the received LV image to the camera control application 401A. Through the foregoing processes, the camera control application 401A can display a live view image received from the digital camera 100 in the live view display region 612. Furthermore, an image in the live view display region 612 is updated by executing the processes of steps S706 and S707 periodically.

A description is now given of a case in which the release button 613 on the UI screen shown in FIG. 6B is pressed.

When the release button 613 is pressed by a user operation, the camera control application 401A issues a release request to the camera SDK 402 in step S708.

Upon receiving the release request, the camera SDK 402 transmits a release request to the digital camera 100 (step S709).

Upon receiving the release request, the digital camera 100 shoots and acquires a new image by performing a release operation.

The add-in purchase button 604 is a button for switching to a mode for purchasing an additional function for remotely controlling the digital camera 100. When the add-in purchase button 604 is pressed by a user operation, an add-in purchase screen 621 shown in FIG. 6C is displayed, on which an additional function that enables control of the digital camera 100 from the smartphone 200 can be purchased.

Figure 6D:
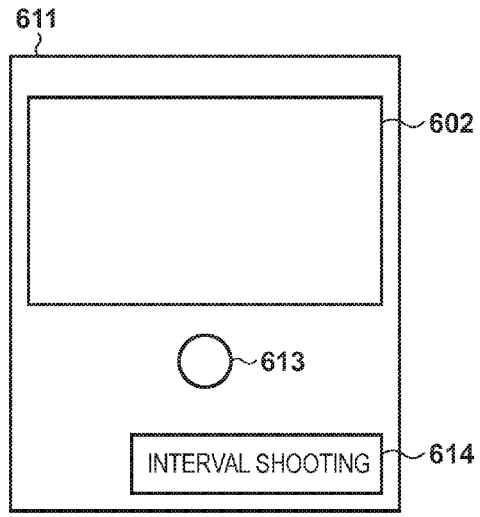
Figure 6B:
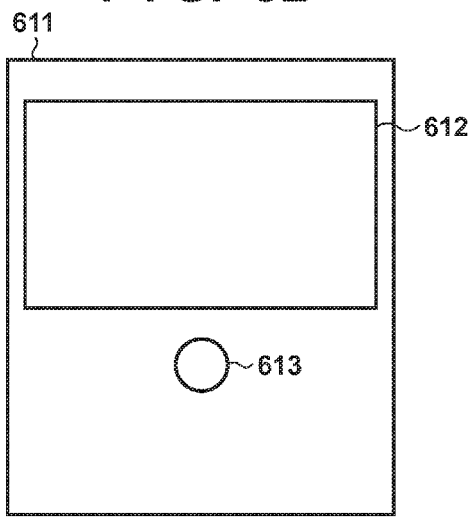
Figure 6E:
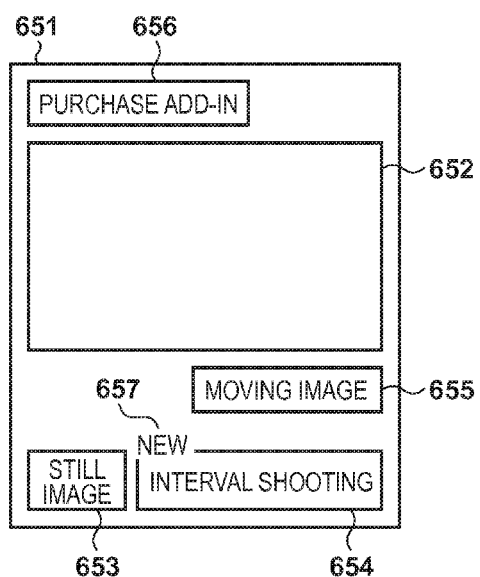
Figure 6C:
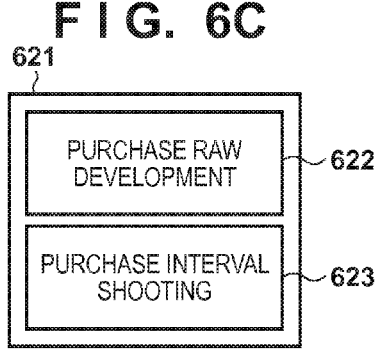

In FIG. 6C, a raw development purchase button 622 and an interval shooting purchase button 623 are displayed as examples of functions that can be added through add-in purchase.

Once the add-in purchase screen 621 has been displayed, the camera control application 401A issues an additional function purchase confirmation request to the camera SDK 402 (step S710).

Upon receiving the additional function purchase confirmation request, the camera SDK 402 transmits an additional function purchase confirmation request to an account server 500 (step S711).

Upon receiving the additional function purchase confirmation request, the account server 500 performs user authentication, confirms the status of the user's purchase of an additional function(s) (step S712), and gives notice of the substance of the purchase of the additional function(s) to the camera SDK 402 (step S713).

The camera SDK 402 confirms the notice from the account server 500 indicating the substance of the purchase of the additional function(s); if no additional function has been purchased, no processing is executed with respect to the digital camera 100.

A description is now given of a case in which the interval shooting purchase button 623 on the UI screen shown in FIG. 6C is pressed.

When the interval shooting purchase button 623 is pressed by a user operation, the camera control application 401A issues an additional function (interval shooting) purchase request to the camera SDK 402 (step S714).

Upon receiving the additional function (interval shooting) purchase request, the camera SDK 402 transmits an additional function (interval shooting) purchase request to the account server 500 (step S715).

Upon receiving the additional function (interval shooting) purchase request, the account server 500 performs user authentication and executes additional function purchase processing by, for example, charging the user (step S716); when the purchase processing has been completed, it gives notice of completion of the purchase of the additional function (interval shooting) to the camera SDK 402 (step S716a).

Upon receiving the notice of completion of the purchase of the additional function (interval shooting) from the account server 500, the camera SDK 402 records additional function (interval shooting) purchase information as an SDK management file into the ROM 202 of the smartphone 200 (step S717).

Thereafter, the camera SDK 402 issues an additional function (interval shooting) purchase notice to the digital camera 100 (step S718).

Upon receiving the additional function (interval shooting) purchase notice from the camera SDK 402, the digital camera 100 adds an operation for controlling the additional function (interval shooting) (step S719), and transmits a device information reacquisition request to the camera SDK 402 (step S720).

Upon receiving the device information reacquisition request from the digital camera 100, the camera SDK 402 transmits a device information acquisition request to the digital camera 100 (step S721). Upon receiving the device information acquisition request from the camera SDK 402, the digital camera 100 transmits current device information (step S722). It should be noted that the device information transmitted here includes information related to the additional function (interval shooting) added in step S719. It should be noted that, in a case where the digital camera 100 transmits device information to the camera SDK 402, it is possible to encrypt additional function information using information that varies with each camera, such as camera serial numbers and MAC addresses, and then transmit the encrypted additional function information; this prevents a situation in which a user who has not purchased an additional function can use the additional function by analyzing a communication protocol between the digital camera 100 and the smartphone 200.

The camera SDK 402 can acknowledge functions that are usable in control of the digital camera 100 by reacquiring the device information from the digital camera 100 in step S722; as the reacquired device information includes the interval shooting function, an additional function (interval shooting) validity notice is issued to the camera control application 401A (step S723).

Upon receiving the additional function (interval shooting) validity notice in step S723, the camera control application 401A notifies the user of the purchased state by displaying the purchased state on the interval shooting purchase button 623 of the add-in purchase screen 621 shown in FIG. 6C.

If the camera control button 603 shown in FIG. 6A is pressed by the user again after the purchase of the interval shooting function, the camera control screen 611 shown in FIG. 6D is displayed, and control of the digital camera 100 from the smartphone 200 is enabled. On the UI screen shown in FIG. 6D, an interval shooting button 614 is displayed in addition to the live view display region 612 and the release button 613, which were displayed prior to the purchase of the interval shooting function, as the functions of the digital camera 100 that can be controlled by the smartphone 200.

Once the camera control screen 611 shown in FIG. 6D has been displayed, the camera control application 401A issues an LV image request to the camera SDK 402 (step S724).

Processes of steps S724 and S725 are similar to the LV image acquisition processes of steps S706 and S707.

A description is now given of a case in which the interval shooting button 614 on the UI screen shown in FIG. 6D is pressed.

When the interval shooting button 614 is pressed by a user operation, the camera control application 401A issues an interval shooting request to the camera SDK 402 (step S726).

Upon receiving the interval shooting request, the camera SDK 402 transmits an interval shooting request to the digital camera 100 (step S727).

Upon receiving the interval shooting request, the digital camera 100 newly performs shooting and acquires an image in every certain time period by performing an interval shooting operation based on the following camera settings: the interval at which interval shooting is performed, and the total number of shot images.

In the present embodiment, the interval at which interval shooting is performed and the total number of shot images are set on the camera side; however, the camera control application 401A may have an individual function of setting the interval at which interval shooting is performed and the total number of shot images to the digital camera 100.

When the camera application 400A is deactivated by a user operation, the camera control application 401A issues a disconnection request to the camera SDK 402 (step S728).

Upon receiving the disconnection request, the camera SDK 402 transmits a disconnection request to the digital camera 100 (step S729).

Upon receiving the disconnection request, the digital camera 100 deletes the operation corresponding to the additional function (interval shooting), and disconnects communication with the smartphone 200.

With reference to FIG. 8, the following describes a processing sequence in which a camera control application 401B, which is different from the camera control application 401A, controls the digital camera 100 after the additional function (interval shooting) has been purchased as described with reference to FIGS. 7A and 7B.

It is assumed that the camera control application 401B is included in a camera application 400B which uses the camera SDK 402 executed by the camera control application 401B and which has been developed by a different developer, that is to say, company B.

In FIG. 8, once the camera application 400B has been activated in the smartphone 200 by a user operation, the camera control application 401B executes processes for connecting to the digital camera 100 (steps S801 to S804) similarly to steps S701 to S704 shown in FIG. 7A.

After the connection processes, the camera SDK 402 refers to an SDK management file stored in the ROM 202 and confirms whether there is additional function purchase information. Here, the SDK management file includes additional function (interval shooting) purchase information indicating that the additional function (interval shooting) was purchased during the use of the camera control application 401A described with reference to FIG. 7B, and therefore the camera SDK 402 issues an additional function (interval shooting) purchase notice to the digital camera 100 (step S806).

In subsequent steps S807 to S811, processes that are similar to the processes of steps S719 to S723 shown in FIG. 7B are executed.

If the camera control button 603 shown in FIG. 6A is pressed by the user, a camera control screen 651 shown in FIG. 6E is displayed, and control of the digital camera 100 from the smartphone 200 is enabled. It should be noted that this UI screen 651 may be displayed at the same time as the activation of the camera application 400B, or may be displayed after receiving a notice of completion of processing up until step S811 from the camera SDK 402.

A live view display region 652, a still image shooting button 653, an interval shooting button 654, a moving image recording button 655, and an add-in purchase button 656 are displayed as examples on the UI screen shown in FIG. 6E. On the camera control screen 651 displayed by the camera control application 401B, the interval shooting button 654 is displayed in a valid state as the additional function (interval shooting) has been purchased. Furthermore, characters indicating that the interval shooting function has newly become valid, such as "NEW" 657, are displayed on the camera control screen 651. It should be noted that, in a case where the interval shooting function has not been purchased yet at the time of display of the camera control screen 651, the interval shooting button 654 is placed in an invalid state, e.g., grayed out, when displayed.

In subsequent steps S812 to S818, processes that are similar to the processes of steps S724 to S730 shown in FIG. 7B are executed.

As described above, in the present embodiment, the camera SDK 402 manages an additional purchase of a control function of the digital camera 100 that can be controlled by the camera control application 401; in this way, a single purchase of an additional function allows all of the camera control applications that use the camera SDK 402 to use the additional function, that is to say, there is no need to purchase the additional function per camera control application.

Although the present embodiment has discussed an example case in which one smartphone 200 switches between two types of camera applications 400A and 400B, the present embodiment is applicable to a case in which different camera applications are used by different smartphones.

Furthermore, although the camera SDK records the additional function purchase information into the SDK management file in the present embodiment, the SDK no longer needs to manage the additional function purchase information if the SDK confirms the additional function purchase information with the account server each time connection is established. In this case, the camera SDK 402 can download the additional function purchase information by accessing the account server 500 and undergoing user authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-142636, filed Jul. 10, 2014 which is hereby incorporated by reference herein in its entirety.

What is claimed is:

1. A communication apparatus which controls an external apparatus, comprising:
   a control device configured to control the communication apparatus;
   a communication device configured to communicate with the external apparatus;
   a memory device configured to store a first program for accepting a user operation and a second program for communicating with the external apparatus via the communication device, the first program and second program are used in a first application software;
   wherein the control device adds to the first application software, using the second program, a predetermined function for controlling the external apparatus, the predetermined function to be added is selected, using the first application software, by the user operation,
   wherein after the predetermined function is added, the control device enables the first program to accept the user operation for transmitting instruction for executing the added predetermined function to the external apparatus via the communication device, and
   wherein after the predetermined function is added, the control device manages added function information using the second program so as to render the added predetermined function usable by a second application software that is different from the first application software.

2. The communication apparatus according to claim 1, wherein when the predetermined function is added, the control device controls the communication unit to give notice of operation information of the added predetermined function to the external apparatus so as to render the added predetermined function usable on the external apparatus.

3. The communication apparatus according to claim 2,
wherein the external apparatus receives, via the communication device, the operation information that renders the added predetermined function usable, and
the external apparatus gives notice of the added predetermined function that is rendered usable by the operation information to the communication apparatus.

4. The communication apparatus according to claim 1,
wherein the additional function information is recorded into a file referred to by a predetermined program for communicating with the external apparatus.

5. The communication apparatus according to claim 4,
wherein upon receiving a connection request from the first program, the second program confirms whether the additional function information is included in the file, and
if the additional function information is included, the control device controls the communication device to transmit operation information to the added predetermined function to the external apparatus so as to render the added predetermined function usable on the external apparatus.

6. The communication apparatus according to claim 4,
wherein the predetermined program is a program generated by a software development kit for the first application software and the second application software.

7. The communication apparatus according to claim 6,
wherein the predetermined program controls communication with the external apparatus using a picture transfer protocol (PTP).

8. The communication apparatus according to claim 1,
wherein the added predetermined function is purchased by the first application software accessing a server.

9. The communication apparatus according to claim 8,
wherein the server manages the additional function information that renders the added predetermined function usable also by the second application software.

10. The communication apparatus according to claim 1,
wherein the external apparatus is an image capturing apparatus, and
the predetermined function is at least one of interval shooting, moving image recording, and raw development.

11. A control method of a communication apparatus which has a control device configured to control the communication apparatus, a communication device configured to communicate with an external apparatus, and a memory device configured to store a first program for accepting a user operation and a second program for communicating with the external apparatus via the communication device, the first program and second program are used in a first application software, the method comprising:
  adding to the first application software, using the second program, a predetermined function for controlling the external apparatus, wherein the predetermined function to be added is selected, using the first application software, by the user operation;
  after the predetermined function is added, enabling the first program to accept the user operation for transmitting instruction for executing the added predetermined function to the external apparatus via the communication device; and
  after the predetermined function is added, managing added function information using the second program so as to render the added predetermined function usable by a second application software that is different from the first application software.

12. A system in which a communication apparatus and an external apparatus are connected,
  wherein the communication apparatus comprises:
  a communication unit configured to control communication with the external apparatus;
  a control unit configured to control the external apparatus by causing the communication unit to transmit, to the external apparatus, operation information for causing the external apparatus to execute a predetermined function; and
  a management unit configured to, when a function controllable on the external apparatus is added, manage additional function information that renders the added function usable also by second application software that is different from first application software, the first application software causing the control unit to function so as to control the external apparatus, and
  wherein the external apparatus comprises:
  a communication unit configured to be capable of communicating with the communication apparatus;
  a control unit configured to execute a function corresponding to operation information received from the communication apparatus; and
  a notification unit configured to, when the function controllable on the external apparatus is added and a notice of operation information of the added function is issued from the communication apparatus, give notice of a usable state of the added function on the external apparatus to the communication apparatus.

13. A non-transitory computer-readable storage medium storing a program for causing a computer to execute the control method of a communication apparatus which has a control device configured to control the communication apparatus, a communication device configured to communicate with an external apparatus, and a memory device configured to store a first program for accepting a user operation and a second program for communicating with the external apparatus via the communication device, the first program and second program are used in a first application software, the method comprising:
  adding to the first application software, using the second program, a predetermined function for controlling the external apparatus, wherein the predetermined function to be added is selected, using the first application software, by the user operation;
  after the predetermined function is added, enabling the first program to accept the user operation for transmitting instruction for executing the added predetermined function to the external apparatus via the communication device; and
  after the predetermined function is added, managing added function information using the second program so as to render the added predetermined function usable by a second application software that is different from the first application software.

* * * * *